(12) United States Patent
Yamamoto

(10) Patent No.: US 6,816,363 B2
(45) Date of Patent: Nov. 9, 2004

(54) PORTABLE INFORMATION TERMINAL CAPABLE OF SLIDING ONE CASE UNIT AGAINST ANOTHER CASE UNIT IN THE USE STATE

(75) Inventor: Atsushi Yamamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/282,034

(22) Filed: Oct. 29, 2002

(65) Prior Publication Data

US 2003/0081375 A1 May 1, 2003

(30) Foreign Application Priority Data

Oct. 30, 2001 (JP) .......................................... 2001-332573

(51) Int. Cl.⁷ ................................................. G06F 1/16
(52) U.S. Cl. ......................... 361/681; 361/683; 455/575; 455/90.3; D14/137
(58) Field of Search ................................. 361/680–683, 361/686; 455/575.1–575.4, 90.3, 433.01–433.12, 156, 173; 345/167–169; D14/137, 138

(56) References Cited

U.S. PATENT DOCUMENTS 5,739,810 A * 4/1998 Merkel ....................... 345/156
6,249,672 B1 * 6/2001 Castiel ...................... 455/575.4
2002/0137476 A1 * 9/2002 Shin ............................. 455/90
2003/0025668 A1 * 2/2003 Lin .............................. 345/156

FOREIGN PATENT DOCUMENTS

| JP | H05-055213 U | 7/1993 |
| JP | 9-6950 A | 1/1997 |
| JP | H09-185095 A | 7/1997 |
| JP | 10-164195 A | 6/1998 |
| JP | 2001-189780 A | 7/2001 |

\* cited by examiner

Primary Examiner—Lisa Lea-Edmonds
(74) Attorney, Agent, or Firm—Sughrue Mion, PLLC

(57) ABSTRACT

An operating unit is configured in such a manner as to freely slide with respect to a main unit. Furthermore, the operating unit and the main unit are electrically and mechanically connected by a resilient cable member having a spiral winding. The resilient cable member having a spiral winding includes an FPC stuck to either one surface or both surfaces of a resilient member having a spiral winding. The present invention facilitates the electric and mechanical connection between a main unit and an operating unit in a portable information terminal.

20 Claims, 5 Drawing Sheets

PORTABLE INFORMATION TERMINAL CAPABLE OF SLIDING ONE CASE UNIT AGAINST ANOTHER CASE UNIT IN THE USE STATE

BACKGROUND OF THE INVENTION

1. Field of the Invention

The present invention relates to electronic equipment, and more particularly to a portable information terminal, which a user carries to retrieve, read out, input and the like information.

2. Description of the Related Art

In general, personal information terminals or portable information terminals called personal digital assistants (PDA) have become popular in recent years. The portable information terminal (hereinafter referred to as "a PDA") comprises a keyboard, a display such as a liquid crystal display panel, a central processing unit (CPU) and a large-capacity semiconductor memory. Basically, it is a small-sized information terminal to be actuated by a built-in battery. High performance CPUs have been available at a relatively inexpensive cost owing to the progress of a semiconductor integration technique, and further, a large-capacity semiconductor memory (hereinafter simply referred to a memory) has been available at an inexpensive cost, thereby achieving a small-sized memory of high performance. A remarkably large quantity of data required for business operations can be stored in the memory. Therefore, the necessary data (i.e., the information) can be read out of a personal computer (PC) and stored in the memory of the PDA. A user brings the PDA to a customer site and retrieves the data stored in the PDA as required.

The data stored in the memory in the above-described PDA can comprise numerous product names, product numbers, prices, delivery dates, inventories, etc. Although the data can be carried in the form of a document, e.g., a catalog or a price list, the document is bulky and can be difficult to update the data, which is changed from moment to moment. In contrast, the use of the PDA enables enormous data not only to be integrated into the small-sized memory but also to be updated with ease, thereby making it possible to make access to the latest data all the time. Moreover, any data processing after the business discussion can be speedily performed with ease by inputting the result of the business discussion into the PDA. Additionally, the PDA can be used in place of name cards by inputting numerous company names, names in charge, contact destinations (such as telephone numbers) and other relevant information about the customers, and further, can be used for the schedule management of the user.

The prior art in the above-described technical field is disclosed in Japanese Laid-Open Patent Application Heisei 10-164195 entitled "Portable Information Equipment" and Japanese Laid-Open Patent Application Heisei 9-6950 entitled "Name Card Reader."

The PDA is required to be reduced in size and weight as possible, to have the sufficient storage capacity of a memory, and to speedily retrieve the necessary data (i.e., information) therefrom with ease. In order to enhance the above-described performance of the PDA, there has been proposed a structure in which a part of the keyboard is movable or slidable with respect to another portion of the PDA, such as the display.

However, the prior art discloses a movable unit comprising a movable structure unit and an electrically connecting unit for transmitting or receiving a signal between the movable unit and the main unit. Therefore, it is necessary to provide spaces for both of the movable structure unit and the electrically connecting unit, thereby making miniaturization difficult and increasing manufacturing costs. Moreover, the electrically connecting unit (i.e., a cable) in an inoperative state (for example, when the PDA is not used or contained) becomes cumbersome, and requires excess storage space.

SUMMARY OF THE INVENTION

An aspect of the present invention is to provide a portable information terminal in which the processing of an electrically connecting unit (i.e., a cable) can be facilitated in a small space.

To solve the above mentioned problem, a portable information terminal comprises a first case unit comprising a display, a second case unit comprising an operation key and a resilient cable member for resiliently retaining said second case unit together with said first, and the second case unit are slidable against the first case unit. The resilient cable member has a spiral winding. Also, the resilient cable member is wound around a center shaft. The portable information terminal of the present invention further comprises a flat circuit board (FPC) that is disposed on both sides of the resilient cable member. Both ends of the resilient cable member are connected to connectors disposed in the first case unit and the second case unit, respectively. The portable information terminal further may comprise a flat circuit board (FPC) that is disposed on either side of the resilient cable member. The portable information terminal further comprises a protecting film that is provided at the other surface of the resilient cable member. Both ends of the resilient cable member are connected to connectors disposed in the first case unit and the second case unit, respectively. The operation key is preferably covered with the first case unit when the portable information terminal is not used. Further, the portable information terminal comprises latching means for latching the second case unit to the first case unit when the second case unit is withdrawn. The portable information terminal of the present invention further comprises a judging means for judging whether or not the second case unit is drawn and a controlling means for controlling a power switch for the portable information terminal based on a result of the judging means. The power switch is automatically turned on when the second case unit is withdrawn. The second case unit preferably slides along guide rails provided in the first case unit. The portable information terminal may be a portable telephone.

In another embodiment of the present invention, the operation key is stored within the first case unit when the portable information terminal is not used. The portable information terminal further comprises a latch that latches the second case unit to the first case unit when the second case unit is pulled from within the first case unit. The portable information terminal further comprises a sensor that determines whether or not the second case unit is pulled from the first case unit, and a controller that activates a power switch for the portable information terminal based on a result of the sensor. The power switch is automatically turned on when the second case unit is pulled from the first case unit. The second case unit slides along guide rails disposed in the first case unit.

The portable information terminal according to the present invention can produce prominent effects in practical use, as described below. First of all, the main unit and the operating unit, which slide with respect to each other in accordance with the use state or the idle (contained) state, are mechanically connected by the use of the resilient cable member having a spiral winding. This provides a portable information terminal with the reduced number of use parts at the low cost in the small size and is excellent in operability.

Furthermore, the extra cable is wound around the center shaft by the use of the resilient cable member comprising the resilient member in which the cable has a spiral winding, thus coping with a play (i.e., an extra portion) of the cable in the idle (contained) state within the small space.

BRIEF DESCRIPTION OF THE DRAWINGS

These and other aspects, features and advantages of the invention will become more fully apparent from the following detailed description taken in conjunction with accompanying drawings. In the drawings.

DETAILED DESCRIPTION OF THE EMBODIMENTS

Hereinafter, each embodiment of the present invention will be described in detail with reference to the drawings.

Figure 1:
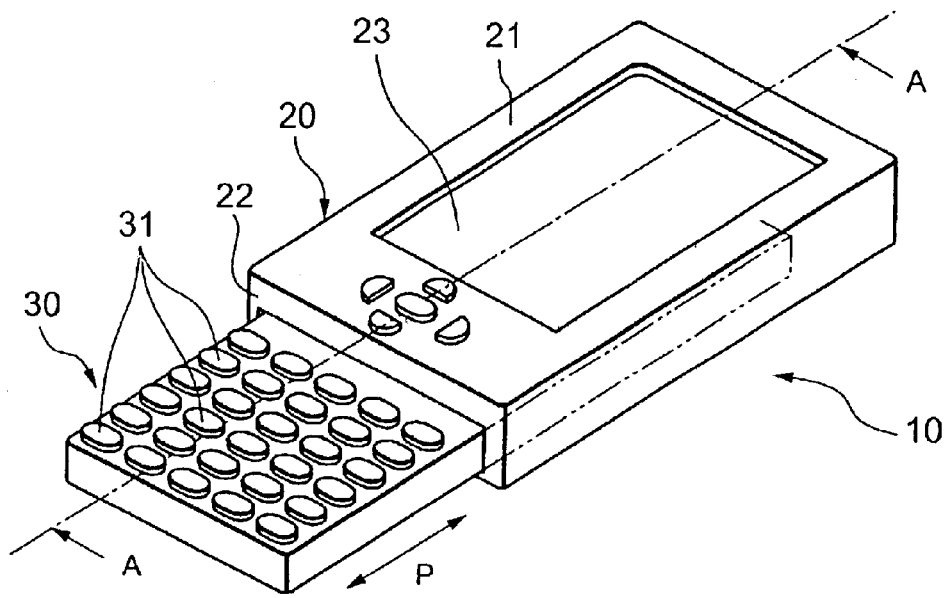
FIG. 1 is a perspective view showing a portable information terminal in a use state in a first preferred embodiment according to the present invention.

First of all, FIG. 1 is a perspective view of a first embodiment showing the outside appearance of a PDA in a use state according to the present invention. The PDA 10 comprises a main unit (or a casing) 20 and an operating unit 30, which is slidably configured to be taken into or out of (i.e., contained in or drawn out of) the main unit 20.

The main unit 20 in the PDA 10 has a substantially rectangular shape (i.e., a rectangular parallelepiped) of a relatively small thickness. At the upper surface 21 of the main unit 20 is disposed a display 23, such as a liquid crystal display panel. Furthermore, at the front surface 22 of the main unit 20, an opening (or a recess) 24 (see FIG. 2) is provided for slidably containing the operating unit 30 therethrough. In the meantime, the operating unit 30 comprises a plurality of operating keys 31. The operating unit 30 is slidable against for the main unit 20 in a direction indicated by a double-headed arrow P in FIG. 1. In order to use the PDA 10, the operating unit 30 is pulled out frontward through the opening 24 provided at the main unit 20. A command is sent to a CPU (not shown) incorporated inside of the main unit 20 by operating the operating keys 31, thereby retrieving or reading out data stored in a memory (not shown) (i.e., displaying the data on the display 23) and enabling new data to be input. In contrast, during the idle state (or in a contained state), the operating unit 30 is inserted through the opening (i.e., the recess) 24 provided at the main unit 20. With this configuration, the PDA 10 is contained inside of the main unit 20 depending upon the size of the display 23 during the idle state, and therefore, it can become remarkably compact.

Figure 2A:
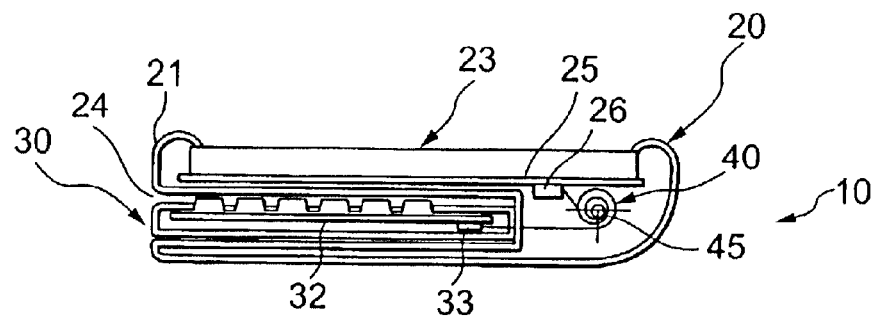
FIG. 2A is cross-sectional view showing the portable information terminal shown in FIG. 1, taken along a line A—A on an idle (i.e., contained) state.
Figure 2B:
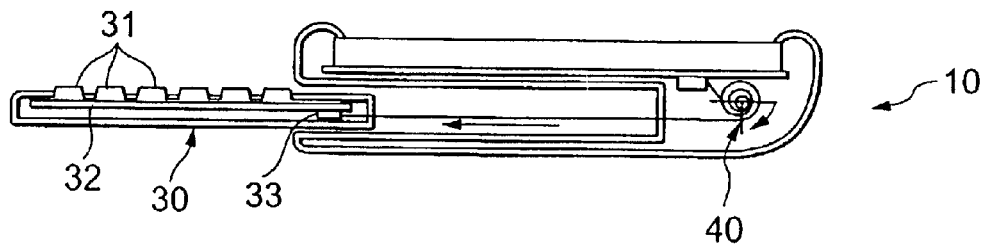
FIG. 2B is cross-sectional view showing the portable information terminal shown in FIG. 1, taken along a line A—A on a use state.

Next, FIGS. 2A and 2B are longitudinal cross-sectional views showing the PDA 10, taken along a line A—A of FIG. 1. FIG. 2A shows an idle (i.e., contained) state of the PDA 10, wherein the operating unit 30 is completely contained inside of the main unit 20, as described above. Consequently, in this state, a user cannot access the operating keys 31. In contrast, FIG. 2B shows a use mode of the PDA 10, wherein the operating unit 30 is drawn frontward out of the front surface 22 of the main unit 20. Consequently, the user can access the operating keys 31.

As shown in the cross-sectional views in FIGS. 2A and 2B, the main unit 20 comprises a circuit board 25. The circuit board 25 comprises a connector 26, together with numerous electronic parts comprising the above-described CPU and memory. Furthermore, the operating unit 30 also comprises a circuit board 32 and a connector 33 connected to the plurality of operating keys 31.

The major feature of the PDA 10 according to the present invention is an electric and mechanical connecting structure of the operating unit 30 and the main unit 20. As described above, the operating unit 30 sends the signals corresponding to the operation of the numerous operating keys 31 to the CPU inside of the main unit 20, and therefore, it must be electrically connected to the main unit 20. Moreover, it is necessary to draw or insert the operating unit 30 through the opening 24 provided at the front surface 22 of the main unit 20. Consequently, a resilient connecting cable member 40 having a spiral winding, as shown in FIGS. 2A and 2B, is provided inside of the main unit 20 in the PDA 10.

Figure 3A:
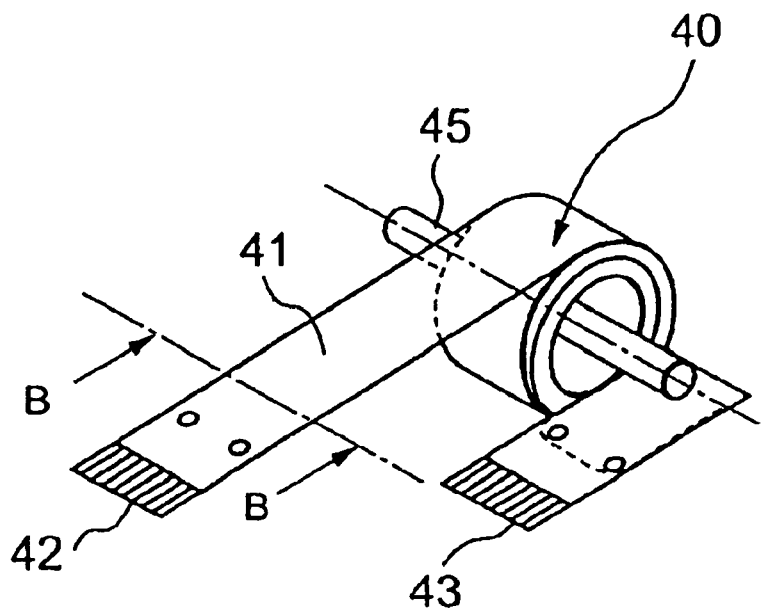
FIG. 3A is view of a resilient cable member having a spiral winding for use in the portable information terminal according to the present invention, especially a perspective view showing the total configuration.
Figure 3B:
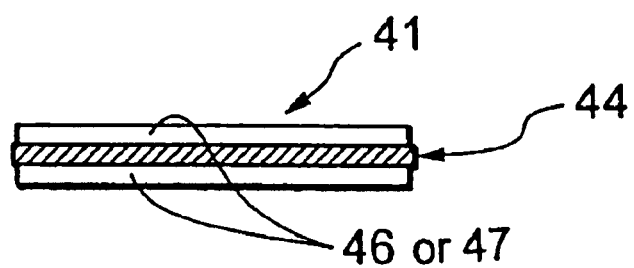
FIG. 3B is view of a resilient cable member having a spiral winding for use in the portable information terminal according to the present invention, especially a lateral cross-sectional view showing a cable shown in FIG. 3A, taken along a line B—B.

FIGS. 3A and 3B are views illustrating the details of the resilient connecting cable member 40 a spiral winding. FIG. 3A is a perspective view showing the general configuration of the resilient connecting cable member 40 having a spiral winding. FIG. 3B is a lateral cross-sectional view showing a cable 41 of FIG. 3A, taken along a line B—B. The resilient connecting cable member 40 having a spiral winding is configured by sticking FPCs (i.e., flat circuit boards) 46 at both surfaces of a metallic or plastic resilient member (i.e., a spring) 44 having a spiral winding, as shown in FIG. 3B. Incidentally, the FPC 46 may be formed at both or either one of the surfaces of the resilient member 44. In the case where the FPC 46 is stuck only to either one of the surfaces of the metallic resilient member 44, a protecting film 47 is formed at the other surface.

The above-described resilient connecting cable member 40 having a spiral winding is wound around a center shaft 45. One end (i.e., the inner end) of the cable 41 is offset, thereby forming a plurality of contacts (i.e., connecting portions) 43, which are connected to the connector 26 of the circuit board 25 in the main unit 20. At the other end of the cable 41 are formed similar contacts 42, which are connected to the connector 33 of the circuit board 32 in the operating unit 30.

In using the PDA 10 configured as described above, a user draws the operating unit 30 frontward by gripping the front end of the operating unit 30 by the fingers. With this operation, there appear the operating keys 31 at the upper surface of the operating unit 30. Thereafter, the user depresses an appropriate key out of the operating keys 31, so as to send a command to the CPU in the main unit 20, thereby retrieving, reading out or inputting necessary data (i.e., information). Here, the operating key 31 operated by the user and the retrieving or reading-out result are displayed on the display 23 in the main unit 20.

Incidentally, the cable 41 of the resilient connecting cable member 40 having a spiral winding is stretched during the use of the PDA 10 since the operating unit 30 is drawn (or slid), and therefore, it is preferable that the operating unit 30 should be latched to the main unit 20 by a mechanical latch (or a mechanical lock). Upon completion of the use, the latch is released, so that the operating unit 30 is inserted into the main unit 20 by the resiliency of the resilient cable member 40 having a spiral winding. Additionally, as shown in FIG. 3G, it is preferable that a power switch for the PDA 10 should be controlled to be turned on or (STEP S2) according to the withdrawal of the operating unit 30 or the above-described latch operation (STEP S1).

Figure 4A:
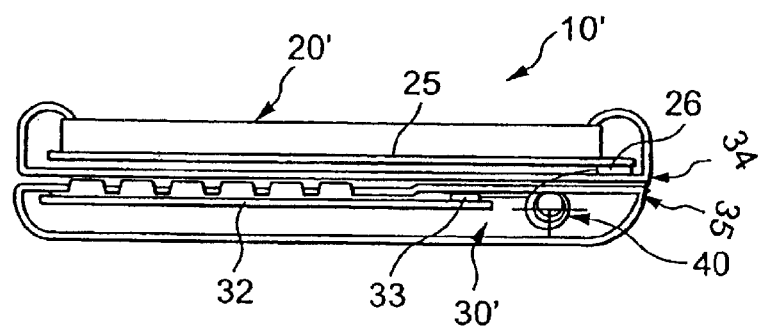
FIG. 4A is a cross-sectional view showing a portable information terminal in a second preferred embodiment according to the present invention on an idle (i.e., contained) state.
Figure 4B:
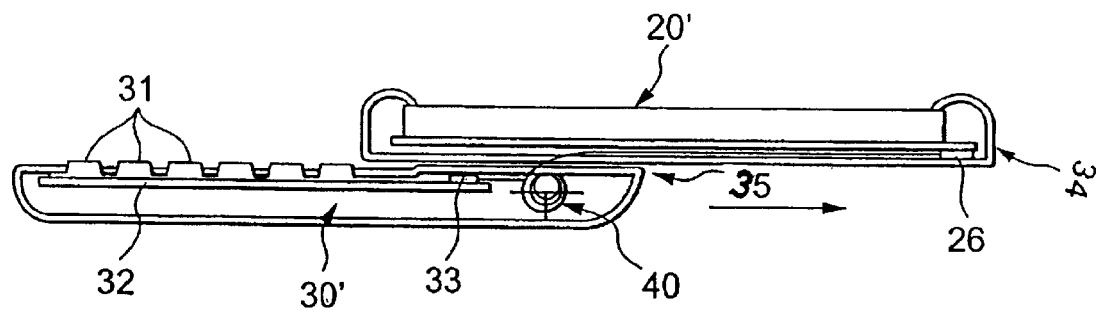
FIG. 4B is a cross-sectional view showing a portable information terminal in a second preferred embodiment according to the present invention on a use state.

Next, FIGS. 4A and 4B is cross-sectional views showing a PDA in a second embodiment according to the present invention, similarly to FIG. 2. FIG. 4A shows a contained (idle) state. FIG. 4B shows a use state. A PDA 10' is featured in not that an operating unit is contained inside of a main unit, but that there are provided double casings, in one of which a display is disposed while in the other of which an operating unit is disposed, the display and the operating unit being slidable with respect to each other. That is to say, one of the casings in which the display is disposed serves as a main unit 20', and the other serves as an operating unit 30'. The main unit 20' is disposed above and the operating unit 30' is disposed below. For example, the main unit 20' and the operating unit 30' are configured in a manner slidable with respect to each other along guide rails 34 and 35.

Figure 3C:
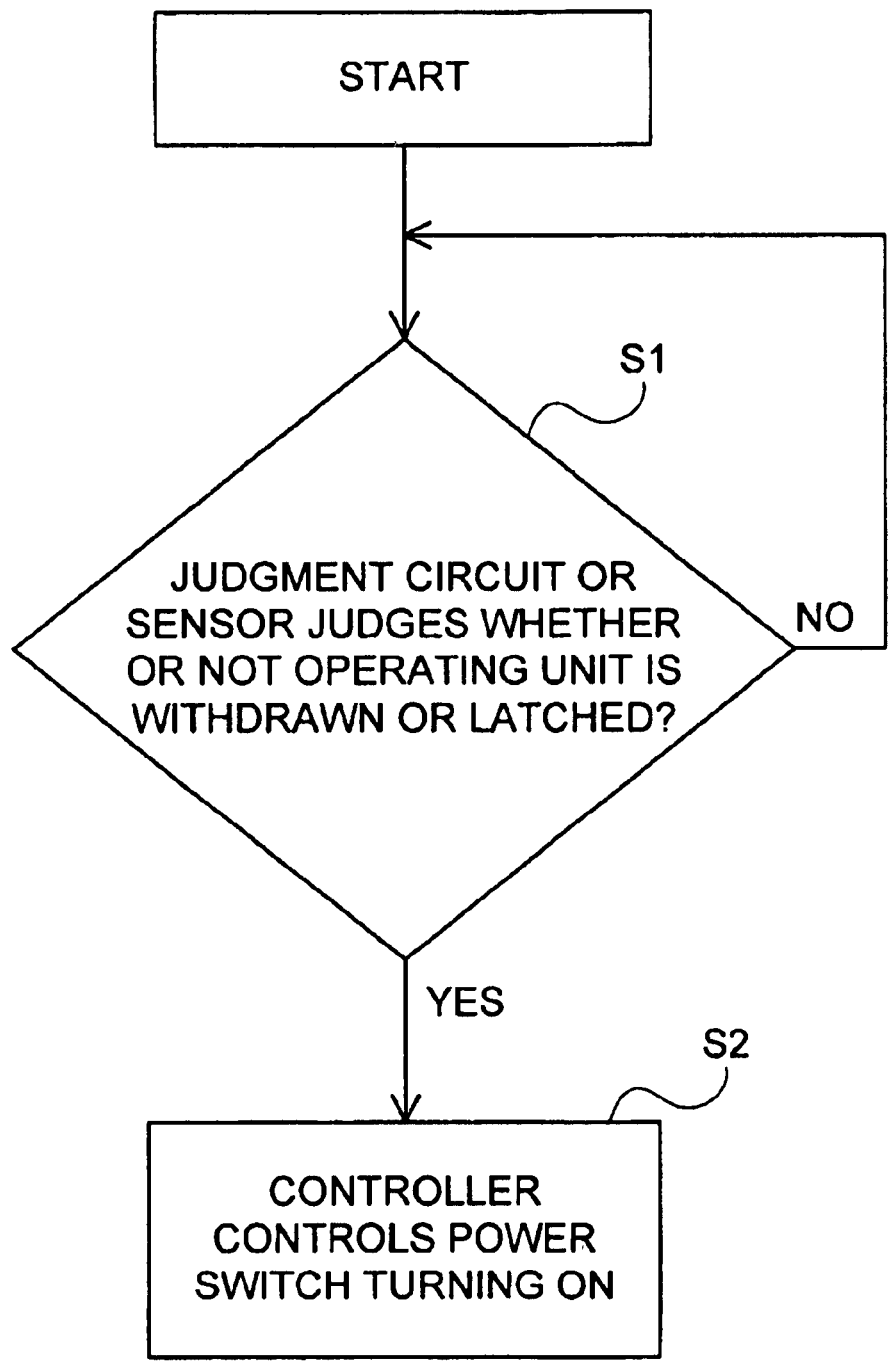
FIG. 3C is a flow chart of controlling procedure of a controller which controls a power switch.

As shown in FIGS. 4A and 4B, a resilient cable member 40 having a spiral winding, for performing the electric and mechanical connection of the main unit 20' and the operating unit 30' is disposed at the rear end of the operating unit 30'. The resilient cable member 40 having a spiral winding is configured in substantially the same manner as the resilient cable member 40 having a spiral winding shown in FIG. 3. One end of a cable 41 is electrically and mechanically connected to a connector 33 disposed in a circuit board 32 in the operating unit 30'. In contrast, the other end of the cable 41 is electrically and mechanically connected to a connector 26 disposed in a circuit board 25 in the main unit 20'.

During the use of the portable information terminal 10', the operating unit 30' disposed under the main unit 20' is drawn out of the main unit 20', as shown in FIG. 4B. In this state, there appear operating keys 31 arranged at the upper surface of the operating unit 30'. A user depresses the operating key 31, thereby enabling necessary information to be retrieved or read out (i.e., displayed on a display) or data to be input. In contrast, during the idle state or upon completion of the use, the operating unit 30' slides in a direction indicated by an arrow in FIG. 4B by the resiliency of the resilient cable member 40 having a spiral winding, and thus, the operating unit 30' comes into an idle (contained) state, as shown in FIG. 4A. In the idle state, the operating unit 30' is superimposed under the main unit 20', thereby reducing the entire length so as to achieve compactness. Furthermore, the operating keys 31 arranged at the upper surface of the operating unit 30' are covered with the main unit 20', thereby making access to the operating keys 31 impossible. In this manner, the operating unit 30', in particular, the operating keys 31 therein are protected.

Figure 5A:
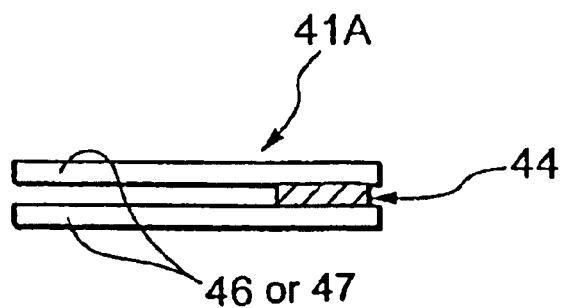
FIG. 5A is a lateral cross-sectional view showing a kind of modifications of the cable constituting the resilient cable member having a spiral winding shown in FIGS. 3A and 3B.
Figure 5B:
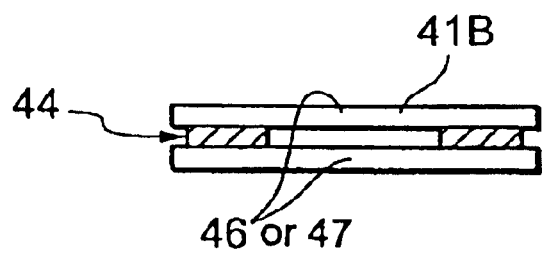
FIG. 5B is also a lateral cross-sectional view showing a kind of modifications of the cable constituting the resilient cable member having a spiral winding shown in FIGS. 3A and 3B.
Figure 5C:
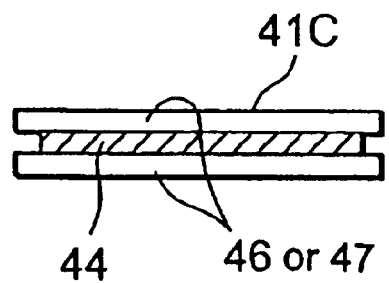
FIG. 5C is also a lateral cross-sectional view showing a kind of modifications of the cable constituting the resilient cable member having a spiral winding shown in FIGS. 3A and 3B.

Subsequently, FIGS. 5A to 5C show various kinds of modifications of the cable 41 constituting the above-described resilient cable member 40 having a spiral winding. FIG. 5A is a cross-sectional view showing a cable 41A (a cross section taken along the line B—B of FIG. 3A), in which a resilient member (i.e., a spring) 44 held between a pair of FPCs 46 (if FPC 46 is stuck only to either of the surface of the resilient member 44, the protective film 47 is formed at the other surface) is placed not over the entire surface of the FPC 46 or 47 but only at either side portion (for example, only at a right end). FIG. 5B is a cross-sectional view showing a cable 41B, in which a resilient member 44 held between a pair of FPCs 46 or between FPC 46 and the protective film 47 are placed only at right and left ends. Alternatively, FIG. 5C is a cross-sectional view showing a cable 41C, in which a resilient member 44 held between a pair of FPCs 46 or between FPC 46 and the protective film 47 is placed at the center portion (namely, no resilient member 44 is placed at both ends in a cable width direction).

Although one resilient cable member has been used in the above-described preferred embodiments, two or more resilient cable members may be used in sliding and perpendicular directions of the portable information terminal. Moreover, although both ends of the cable in the resilient cable member having a spiral winding have been connected to the connectors disposed in the circuit boards in the main unit and the operating unit, respectively, they may be connected directly to the circuit boards, respectively, by the conventional technique such as soldering. Additionally, it is to be understood that the portable information terminal according to the present invention can be applied to a mobile telephone, thus improving the convenience of a mobile telephone.

Obviously, numerous additional modifications and variations of the present invention are possible in light of the above teachings. It is, therefore, to be understood that within the scope of the appended claims, the invention may be practiced otherwise than as specifically described herein.

What is claimed is:

1. A portable information terminal, comprising:
   a first case unit comprising a display;
   a second unit comprising an operation key; and
   a resilent cable member for resiliently retaining said second case unit together with said first case unit;
   wherein said second case unit is slidable against said first unit.

2. The portable information terminal as claimed in claim 1, wherein said resilient cable member has a spiral winding.

3. The portable information terminal as claimed in claim 2, wherein said resilient cable member is wound around a center shaft.

4. The portable information terminal as claimed in claim 3, further comprising a flat circuit board that is desposed on both sides of said resilient cable member.

5. The portable information terminal as claimed in claim 4, wherein both ends of said resilient cable member are connected to connectors disposed on said first case unit and said second case unit, respectively.

6. The portable information terminal as claimed in claim 3, further comprising a flat circuit board that is disposed on either side of said resilient cable member.

7. The portable information terminal as claimed in claim 6, further comprising a protective film that disposed on the other surface of said resilient cable member.

8. The portable information terminal as claimed in claim 7, wherein both ends of said resilient cable member are connected to connectors dispoised in said first case unit and said second case unit, respectively.

9. The portable information terminal as claimed in claim 3, wherein said operation key is covered with said first case unit when said portable information terminal is not used.

10. The portable information terminal as claimed in claim 9, further comprising latching means for latching said second case unit to said first case unit when said second case unit is withdrawn from said first case unit.

11. The portable information terminal as claimed in claim 10, further comprising:
   judging means for judging whether or not said second case unit is withdrawn from said first case unit; and
   controlling means for controlling a power switch for said portable information terminal based on a result of said judging means.

12. The portable information terminal as claimed in claim 11, wherein said power switch is automatically turned on when said second case unit is withdrawn from said first case unit.

13. The portable information terminal as claimed in claim 9, wherein said second case unit slides along guide rails disposed in said first case unit.

14. The portable information terminal as claimed in claim 13, wherein said portable information terminal is a portable telephone.

15. The portable information terminal as claimed in claim 1, wherein said portable information terminal is a portable telephone.

16. The portable information terminal as claimed in claim 3, wherein said operation key is stored within said first case unit when said portable information terminal is not used.

17. The portable information terminal as claimed in claim 16, further comprising a latch that latches said second case unit to said first case unit when said second case unit is pulled from within said first case unit.

18. The portable information terminal as claimed in claim 17, further comprising:
   a sensor that determines whether or not said second case unit is pulled from said first case unit: and
   a controller that activates a power switch for said portable information terminal based on a result of said sensor.

19. The portable information terminal as claimed in claim 18, wherein said power switch is automatically turned on when said second case unit is pulled from said first case unit.

20. The portable information terminal as claimed in claim 18, wherein said power switch is automatically turned on when said second case unit is pulled from said first case unit.

* * * * *